United States Patent
Mohamed et al.

(10) Patent No.: US 11,829,931 B2
(45) Date of Patent: Nov. 28, 2023

(54) ESTIMATING SYSTEM, ESTIMATING METHOD, AND INFORMATION STORAGE MEDIUM

(71) Applicant: Rakuten Group, Inc., Tokyo (JP)

(72) Inventors: Mohamed Reda Elsayed Mohamed, Tokyo (JP); Jeremiah Luke Anderson, Tokyo (JP); Binh Nguyen, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 523 days.

(21) Appl. No.: 17/064,792

(22) Filed: Oct. 7, 2020

(65) Prior Publication Data
US 2021/0103888 A1 Apr. 8, 2021

(30) Foreign Application Priority Data
Oct. 8, 2019 (JP) .................................. 2019-184981

(51) Int. Cl.
*G06Q 10/0833* (2023.01)
*G01C 21/20* (2006.01)
*G06N 20/00* (2019.01)
*H04W 64/00* (2009.01)
*G01C 21/34* (2006.01)

(52) U.S. Cl.
CPC ....... *G06Q 10/0833* (2013.01); *G01C 21/206* (2013.01); *G01C 21/3492* (2013.01); *G06N 20/00* (2019.01); *H04W 64/003* (2013.01); *H04W 64/006* (2013.01)

(58) Field of Classification Search
CPC ............. G06Q 10/083; G06Q 10/0832; G06Q 10/0833; G06Q 10/0835; G06Q 10/0837; G06Q 10/0838
See application file for complete search history.

(56) References Cited

U.S. PATENT DOCUMENTS

| | | | | |
|---|---|---|---|---|
| 2019/0114564 A1* | 4/2019 | Ferguson | .......... | G06Q 10/06312 |
| 2019/0130354 A1* | 5/2019 | Han | .................... | G06Q 10/0832 |
| 2019/0385121 A1* | 12/2019 | Waliany | .................... | G06F 9/54 |
| 2020/0160264 A1* | 5/2020 | Silverman | ......... | G06Q 10/06315 |

FOREIGN PATENT DOCUMENTS

JP 2008-030951 A 2/2008

OTHER PUBLICATIONS

Barbour, William, et al. "Prediction of arrival times of freight traffic on US railroads using support vector regression." Transportation Research Part C: Emerging Technologies 93 (2018): 211-227. (Year: 2018).*

* cited by examiner

Primary Examiner — Emmett K. Walsh
(74) Attorney, Agent, or Firm — Sughrue Mion, PLLC

(57) ABSTRACT

Provided is an estimating system including at least one processor configured to: acquire first feature information on each first place of a plurality of first places to which a mobile object is to move in order; input the first feature information on the each first place to a learning model, which has learned a relationship between second feature information on each second place of a plurality of second places to which one of the mobile object and another mobile object has moved in order in the past and an arrival time at the each second place; and acquire an arrival time at the each first place estimated by the learning model.

12 Claims, 12 Drawing Sheets

SECOND FEATURE INFORMATION

| DELIVERY PERSON ID | DELIVERY ORDER | CUMULATIVE VEHICLE MOVEMENT DISTANCE | CUMULATIVE WALKING MOVEMENT DISTANCE | CUMULATIVE NUMBER OF STORIES | TIME SLOT | DAY OF WEEK | AREA | WEATHER CONDITION | ACTUAL ARRIVAL TIME |
|---|---|---|---|---|---|---|---|---|---|
| s00001 | 1 | 200 | 20 | 8 | 10 AM | SATURDAY | ROPPONGI AREA | 0mm OF PRECIPITATION | 4 MINUTES |
| s00001 | 2 | 360 | 35 | 13 | 10 AM | SATURDAY | ROPPONGI AREA | 0mm OF PRECIPITATION | 7 MINUTES |
| s00001 | 3 | 850 | 40 | 20 | 10 AM | SATURDAY | ROPPONGI AREA | 0mm OF PRECIPITATION | 15 MINUTES |
| ... | ... | ... | ... | ... | ... | ... | ... | ... | ... |

ESTIMATING SYSTEM, ESTIMATING METHOD, AND INFORMATION STORAGE MEDIUM

CROSS-REFERENCE TO RELATED APPLICATION

The present application claims priority from Japanese application JP 2019-184981 filed on Oct. 8, 2019, the content of which is hereby incorporated by reference into this application.

BACKGROUND OF THE INVENTION

1. Field of the Invention

The present disclosure relates to an estimating system, an estimating method, and an information storage medium.

2. Description of the Related Art

There have been investigated technologies for estimating an arrival time at which a mobile object, such as a delivery person or a delivery vehicle, is to arrive at each of a plurality of places to which the mobile object is to move in order. For example, in Japanese Patent Application Laid-open No. 2008-030951, there is described a system configured to estimate, when a delivery person is to deliver a package to each of a plurality of places in order, an arrival time at each place based on a travel time database in which travel times between given places and other places are registered.

SUMMARY OF THE INVENTION

However, in Japanese Patent Application Laid-open No. 2008-030951, the arrival time can be acquired only for known places that have been registered in the travel time database, and therefore the arrival time can be estimated only when the delivery person moves between known places. As a result, when an unknown place is included in the places to which the delivery person is to move, the arrival time cannot be estimated.

It is an object of the present disclosure to provide an estimating system, an estimating method, and an information storage medium, which are capable of estimating an arrival time even for an unknown place.

According to one aspect of the present invention, there is provided an estimating system including at least one processor, the at least one processor being configured to: acquire first feature information on each first place of a plurality of first places to which a mobile object is to move in order; input the first feature information on the each first place to a learning model, which has learned a relationship between second feature information on each second place of a plurality of second places to which one of the mobile object and another mobile object has moved in order in the past and an arrival time at the each second place; and acquire an arrival time at the each first place estimated by the learning model.

According to one aspect of the present invention, there is provided an estimating method, including: acquiring first feature information on each first place of a plurality of first places to which a mobile object is to move in order; inputting the first feature information on the each first place to a learning model, which has learned a relationship between second feature information on each second place of a plurality of second places to which one of the mobile object and another mobile object has moved in order in the past and an arrival time at the each second place; and acquiring an arrival time at the each first place estimated by the learning model.

According to one aspect of the present invention, there is provided an information storage medium having stored thereon a program for causing a computer to: acquire first feature information on each first place of a plurality of first places to which a mobile object is to move in order; input the first feature information on the each first place to a learning model, which has learned a relationship between second feature information on each second place of a plurality of second places to which one of the mobile object and another mobile object has moved in order in the past and an arrival time at the each second place; and acquire an arrival time at the each first place estimated by the learning model.

BRIEF DESCRIPTION OF THE DRAWINGS

FIG. 9 is a table for showing a data storage example of a teacher data set.

DETAILED DESCRIPTION OF THE INVENTION

1. Overall Configuration of Estimating System

Figure 1:
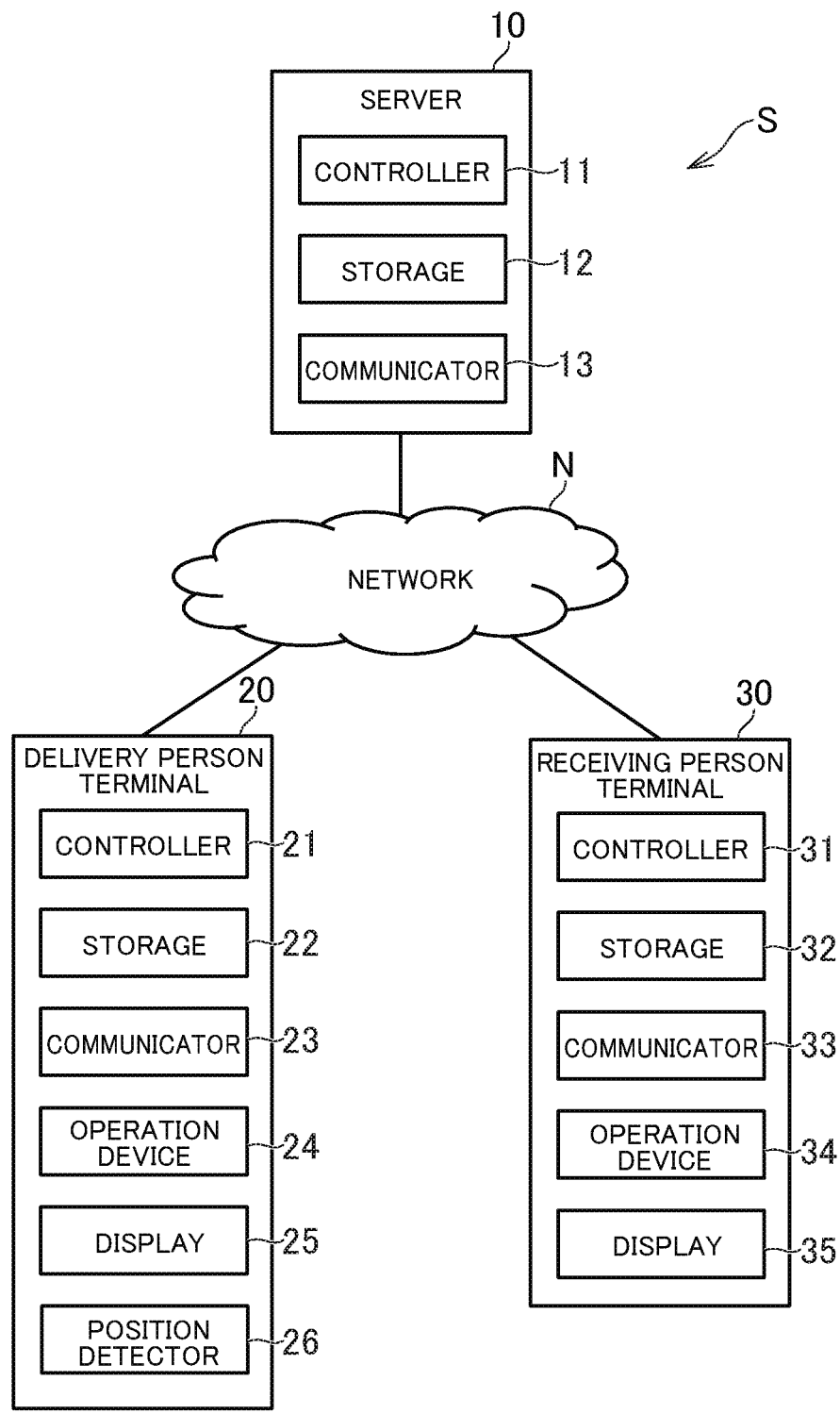
FIG. 1 is a diagram for illustrating an example of an overall configuration of an estimating system according to at least one embodiment of the present invention.

Now, an estimating system according to at least one aspect of the present invention is described by taking an exemplary embodiment of the present invention. In at least one embodiment, the configuration of the estimating system is described by giving as an example a case in which packages are delivered. FIG. 1 is a diagram for illustrating an example of the overall configuration of the estimating system. As illustrated in FIG. 1, an estimating system S includes a server 10, a delivery person terminal 20, and a receiving person terminal 30, each of which can be connected to a network N, for example, the Internet. In FIG. 1, there is illustrated one server 10, one delivery person terminal 20, and one receiving person terminal 30, but there may be a plurality of each of those.

The server 10 is a server computer. The server 10 includes a controller 11, a storage 12, and a communicator 13. The controller 11 includes at least one processor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a ROM, an EEPROM, a flash memory, or a hard disk drive. The communicator 13 is a communication interface for wired communication or wireless communication, and performs data communication via the network N.

The delivery person terminal 20 is a computer to be operated by the delivery person. For example, the delivery person terminal 20 is a cell phone (including smartphones), a portable information terminal (including tablet computers or wearable terminals), or a personal computer. For example, the delivery person terminal 20 is portable and moves together with the delivery person. The delivery person terminal 20 may be a navigation terminal included in a delivery vehicle. For example, the delivery person terminal 20 includes a controller 21, a storage 22, a communicator 23, an operation device 24, a display 25, and a position detector 26. The physical configuration of each of the controller 21, the storage 22, and the communicator 23 may be the same as those of the controller 11, the storage 12, and the communicator 13, respectively.

The operation device 24 is an input device, and is, for example, a pointing device such as a touch panel and a mouse, a keyboard, or a button. The operation device 24 transmits details of operation by the user to the controller 21. The display 25 is, for example, a liquid crystal display or an organic EL display. The display 25 displays an image in accordance with an instruction of the controller 21.

The position detector 26 is a device configured to detect a position on the earth. For example, the position detector 26 includes a receiver configured to receive signals from satellites. In at least one embodiment, a GPS sensor is described as the receiver, but a GNSS sensor other than GPS may be used. The method of detecting the position is not limited to a method using signals from satellites, and any method may be used. For example, the position detector 26 may detect the position by using details of communication to/from a wireless base station, a wireless access point, or the like, or may detect the position by using a detection signal obtained by an acceleration sensor, a gyro sensor, or the like. As another example, the position detector 26 may detect the position by using an image photographed by a camera.

The receiving person terminal 30 is a computer to be operated by a person who is to receive the package. For example, the receiving person terminal 30 is a cellphone (including smartphones), a portable information terminal (including tablet computers or wearable terminals), or a personal computer. For example, the receiving person terminal 30 includes a controller 31, a storage 32, a communicator 33, an operation device 34, and a display 35. The physical configuration of each of the controller 31, the storage 32, the communicator 33, the operation device 34, and the display 35 may be the same as those of the controller 11, the storage 12, the communicator 13, the operation device 24, and the display 25, respectively.

Programs and data to be described as being stored into the storages 12, 22, and 32 may be supplied thereto via the network N. Further, the respective hardware configurations of the computers described above are not limited to the above-mentioned examples, and various types of hardware can be applied thereto. For example, the hardware configuration may include a reader (e.g., an optical disc drive or a memory card slot) configured to read a computer-readable information storage medium, or an input/output device (e.g., a USB port) configured to input and output data to/from an external device. For example, the program and the data stored in the information storage medium may be supplied to each of the computers through intermediation of the reader or the input/output device.

2. Outline of Estimating System

In at least one embodiment, a plurality of packages are loaded on a delivery vehicle, such as a car, a motorcycle, or a bicycle. The delivery person drives or rides the delivery vehicle to visit a plurality of delivery destinations in order. For example, the server 10 determines, based on a known route search method using Dijkstra's method, the A-star method, or the like, a delivery route so that each delivery destination is visited in an order determined in advance. The delivery person moves along the delivery route determined by the server 10.

Figure 2:
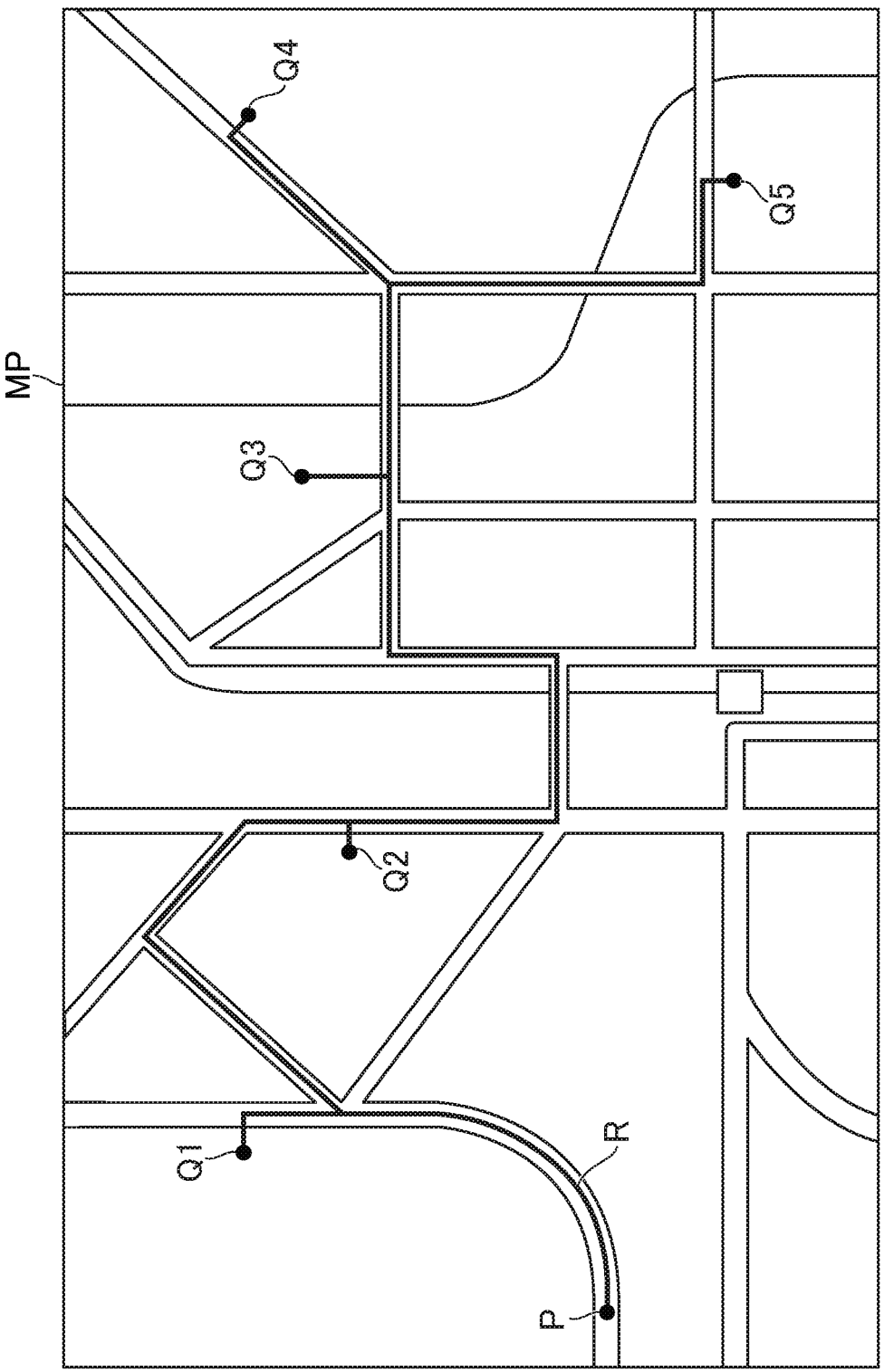
FIG. 2 is a map for showing an example of a delivery route.

FIG. 2 is a map for showing an example of the delivery route. In FIG. 2, a delivery route R is shown on a map MP. For example, the delivery person moves from a departure position (current position) P to, in order, delivery destinations Q1 to Q5 on the delivery route R. In the following description, the reference symbol for a delivery destination may be written as "Qn". The numerical value of n in Qn is a natural number indicating the order of delivery, and in the example of FIG. 2, is any integer of from 1 to 5.

In at least one embodiment, the server 10 uses a learning model to estimate the arrival time at a delivery destination Qn. The learning model is a model used in machine learning, such as, supervised machine learning, semi-supervised machine learning, or unsupervised machine learning. Various known methods can be used for the machine learning itself. For example, a method used in a neural network, reinforcement learning, or deep learning can be used. The server 10 causes the learning model to estimate the arrival time at the delivery destination Qn by using a feature of the delivery destination Qn.

Figure 3:
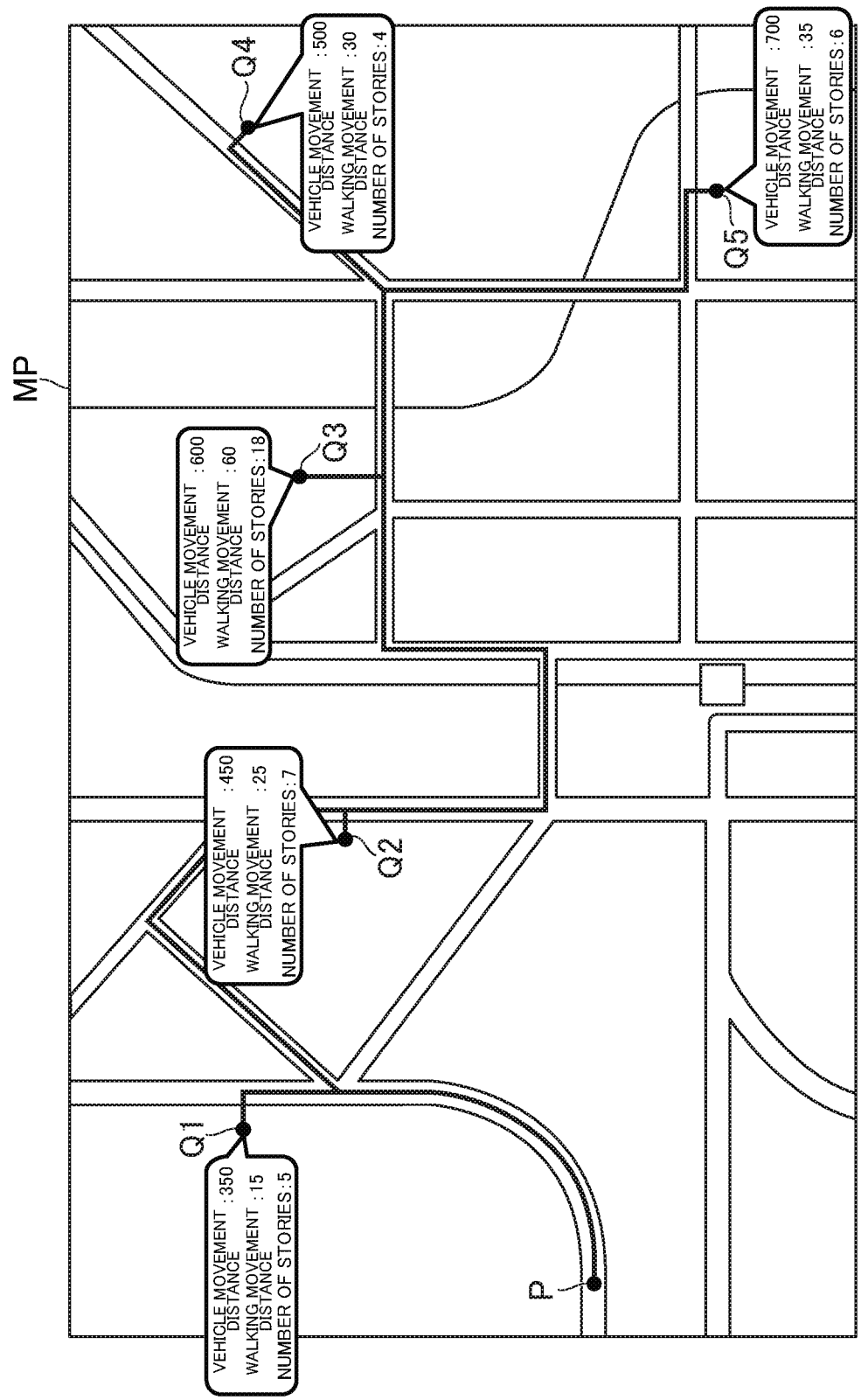
FIG. 3 is a map for showing an example of delivery destination features.

FIG. 3 is a map for showing an example of features of the delivery destination Qn. The features of the delivery destination Qn are pieces of information that influence the arrival time at the delivery destination Qn. Examples of such information may include a geographical feature of the delivery destination Qn, a feature of a building at the delivery destination Qn, a temporal feature of time when the delivery destination Qn is visited, a feature of the delivery person visiting the delivery destination Qn, and a weather condition feature at the delivery destination Qn. The arrival time at the delivery destination Qn changes in accordance with the features of the delivery destination. As shown in FIG. 3, in at least one embodiment, as an example of the features of the delivery destination Qn, there are described a vehicle movement distance, a walking movement distance, and a number of stories.

The vehicle movement distance is a distance that the delivery person moves in the delivery vehicle. In other words, the vehicle movement distance is a travel distance of the delivery vehicle, a movement distance on a road, or a movement distance other than a walking movement distance. For example, the vehicle movement distance of the delivery destination Q1 is a distance on a delivery route R from the departure position P to a position at which the delivery vehicle stops near the delivery destination Q1. As another example, the vehicle movement distance of a delivery destination Qn for which n is 2 or more (Q2 to Q5) is the distance on the delivery route R from the position at which the delivery vehicle stops near the immediately preceding delivery destination Qn−1 to the position at which the delivery vehicle stops near the delivery destination Qn. In at least one embodiment, there is described a case in which the vehicle movement distance indicates a two-dimensional (planar) distance on the map MP, but the vehicle movement distance may indicate a three-dimensional (3D) distance including a height difference.

The walking movement distance is a distance that the delivery person moves on foot. In other words, the walking movement distance is a distance that the delivery person walks or runs, a distance from the position at which the delivery vehicle stops near the delivery destination Qn to the delivery destination Qn, a movement distance in the site of the delivery destination Qn, or a movement distance other than the vehicle movement distance. For example, the walking movement distance of the delivery destination Qn is a distance from the nearest road to the delivery destination Qn. As another example, the walking movement distance of the delivery destination Qn is the distance from the nearest vehicle parking lot or bicycle parking lot to the delivery destination Qn. In at least one embodiment, there is described a case in which the walking movement distance indicates a two-dimensional (planar) distance on the map MP, but the walking movement distance may indicate a three-dimensional (3D) distance including a height difference.

The number of stories of a building is the total number of stories of the building at the delivery destination Qn. When the building has a large number of stories, movement in the building takes time. Therefore, in at least one embodiment, the number of stories of the building is used as a feature. In place of using the total number of stories of the building, the floor that the room of the delivery destination Qn is on may be used as a feature. For example, when the delivery destination Qn is on the sixth floor of a ten-story building, the information "sixth floor" may be used as a feature in place of the information "ten stories". The number of stories of the building may also include, for example, not only the number of stories that are above ground, but also the number of stories that are underground.

The vehicle movement distance, the walking movement distance, and the number of stories of the delivery destination Qn are features relating to only that place, and for the delivery destinations Qn (Q2 to Q5) for which n is 2 or more, it is also required to take into consideration the vehicle movement distance, the walking movement distance, and the number of stories of the delivery destinations through which the delivery person is to pass up to the delivery destination Qn−1. For this reason, the server 10 calculates cumulative values of the vehicle movement distance, the walking movement distance, and the number of stories of the delivery destinations through which the delivery person is to pass up to the delivery destination Qn−1, and estimates the arrival time at the delivery destination Qn.

In the following description, the cumulative values of the vehicle movement distance, the walking movement distance, and the number of stories are referred to as a cumulative vehicle movement distance, a cumulative walking movement distance, and a cumulative number of stories, respectively. The delivery destination Q1 has no via points, and therefore the cumulative vehicle movement distance, cumulative walking movement distance, and cumulative number of stories of the delivery destination Q1 are the same as the vehicle movement distance, walking movement distance, and number of stories of the delivery destination Q1. The cumulative vehicle movement distance, cumulative walking movement distance, and cumulative number of stories of the delivery destinations Qn (Q2 to Q5) for which n is 2 or more are the sum of the vehicle movement distance, walking movement distance, and number of stories of the delivery destination Qn and the vehicle movement distances, walking movement distances, and numbers of stories of the delivery destinations up to the delivery destination Qn−1.

In at least one embodiment, the arrival time at the delivery destination Qn is estimated not only by considering cumulative features, but also by considering non-cumulative features. The server 10 acquires feature information indicating the values of those features for each delivery destination Qn.

Figure 4:
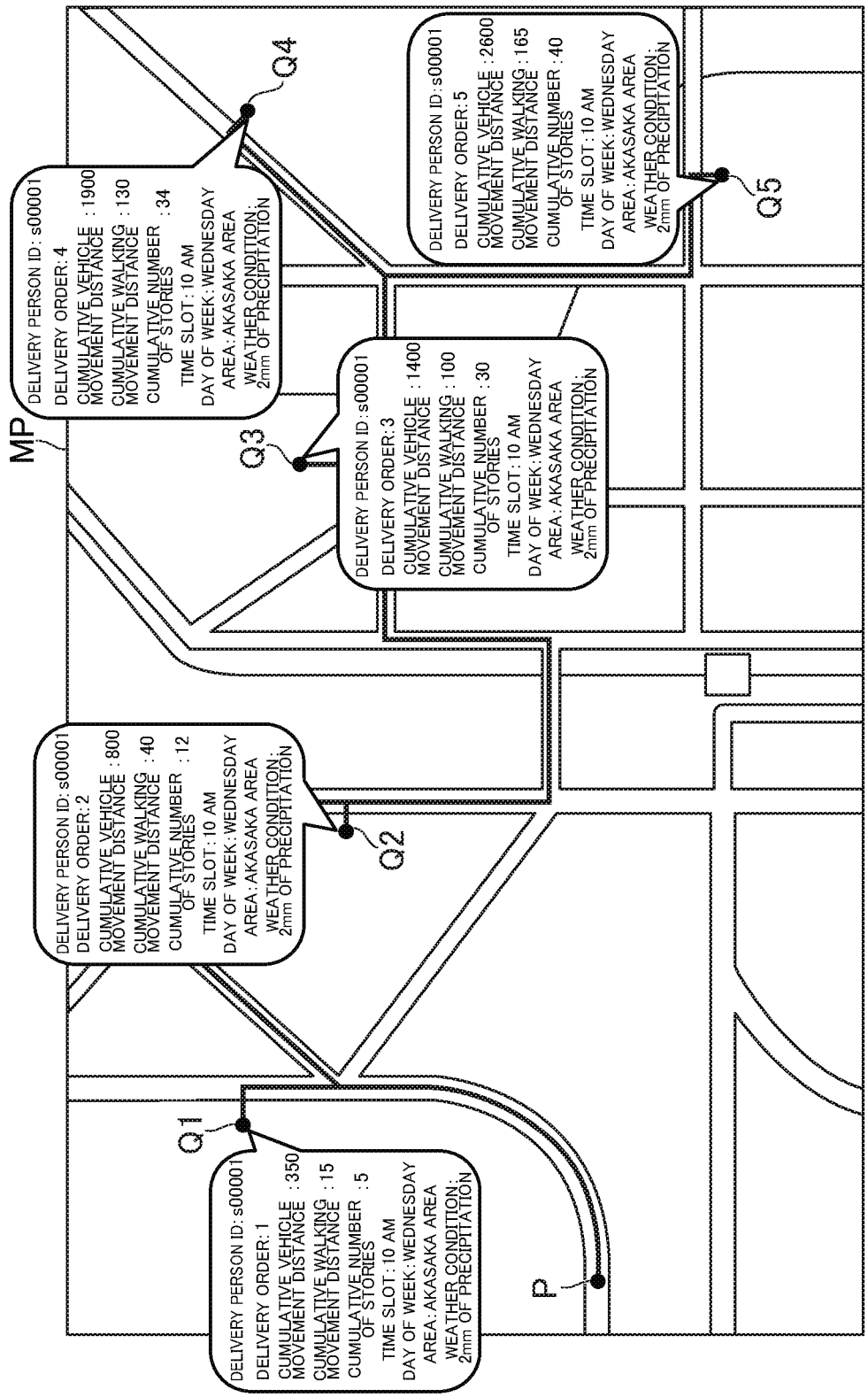
FIG. 4 is a map for showing an example of feature information acquired for each delivery destination.

FIG. 4 is a map for showing an example of feature information acquired for each delivery destination Qn. As shown in FIG. 4, the feature information on the delivery destination Qn includes values for nine items, namely, a delivery person ID, a delivery order, the cumulative vehicle movement distance, the cumulative walking movement distance, the cumulative number of stories, a time slot, a day of the week, an area, and a weather condition. The delivery person ID, the delivery order, the time slot, the day of the week, the area, and the weather condition are examples of non-cumulative features. The number of items included in the feature information may be any number.

The delivery person ID is information for uniquely identifying a delivery person. A movement speed may be different depending on the delivery person, and therefore in at least one embodiment, consideration is given to the delivery person ID. A degree of road congestion and ease of movement may also change depending on the delivery order, the time slot, the day of the week, the area, and the weather condition, and therefore in at least one embodiment, consideration is given to those features.

In the learning model, a relationship between the values of the above-mentioned nine items of a delivery destination to which a delivery has been performed in the past and the actual arrival time at that delivery destination has been learned. When the feature information on a delivery destination Qn is input to the learning model, the arrival time at the delivery destination Qn is estimated by the learning model. For example, the arrival time at the delivery destination Qn estimated by the learning model is displayed on the display 25 of the delivery person terminal 20.

Figure 5:
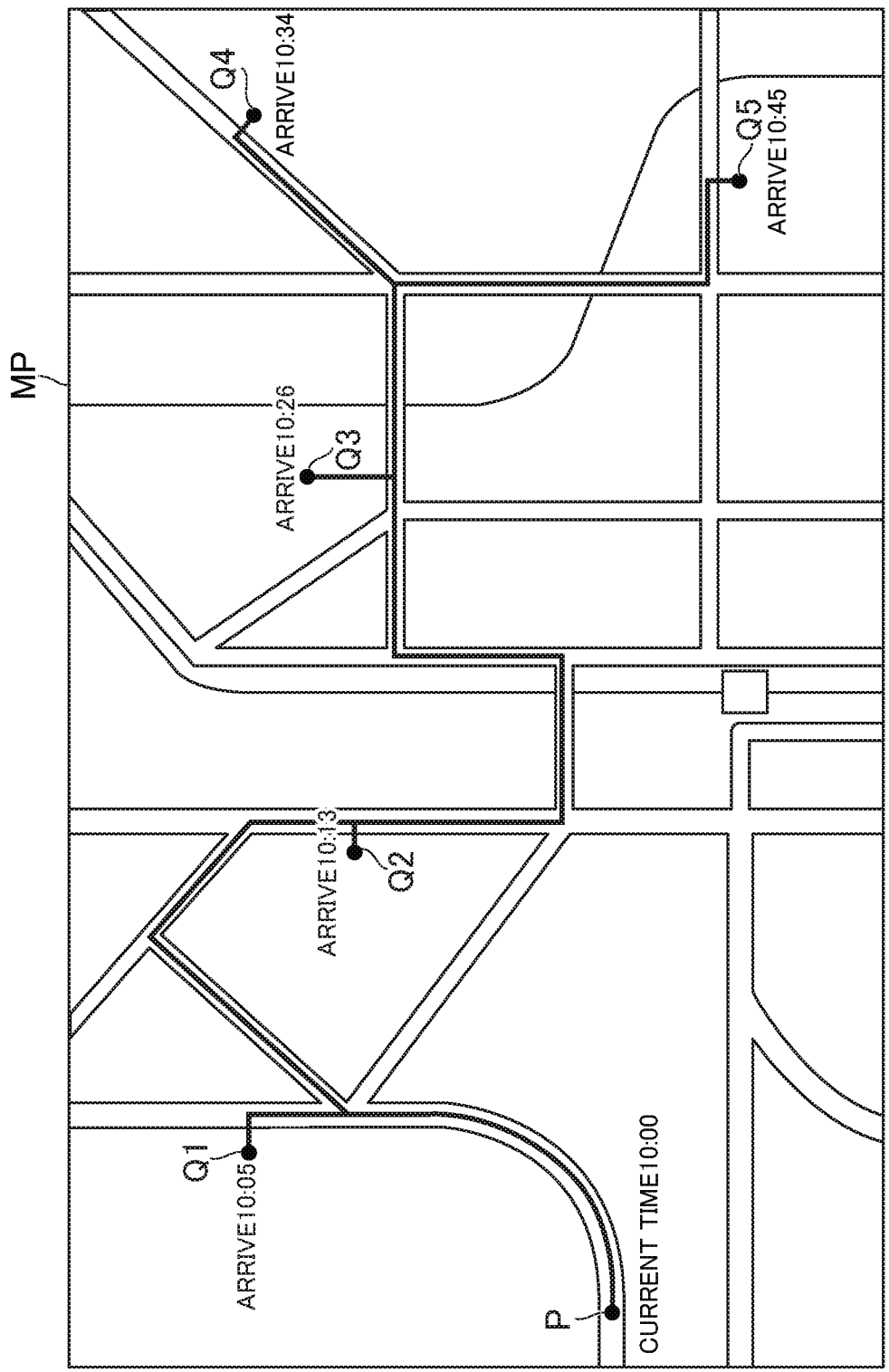
FIG. 5 is a map for showing how an arrival time at a delivery destination is displayed on a display on a delivery person terminal.

FIG. 5 is a map for showing how the arrival time at the delivery destination Qn is displayed on the display 25 of the delivery person terminal 20. As shown in FIG. 5, the map MP is displayed on the display 25 of the delivery person terminal 20, and the delivery route R and the arrival time at the delivery destination Qn are displayed on the map MP. The delivery person confirms those pieces of information, and performs delivery work. In at least one embodiment, when the arrival time at the delivery destination Qn approaches, an electronic mail (email) showing the arrival time is transmitted to the receiving person.

Figure 6:
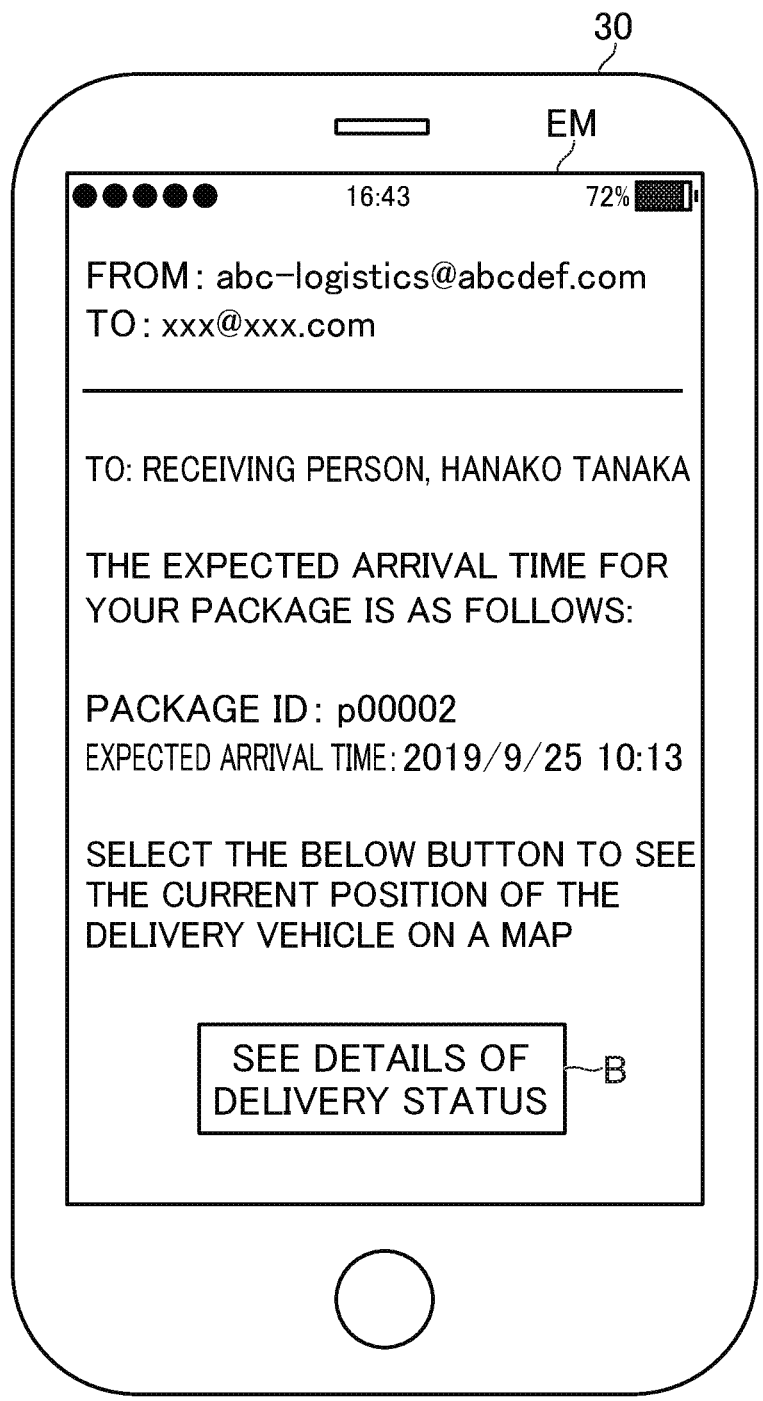
FIG. 6 is a diagram for illustrating how an electronic mail (email) showing an arrival time is displayed on a receiving person terminal.

FIG. 6 is a diagram for illustrating how an electronic mail showing the arrival time is displayed on the receiving person terminal 30. As illustrated in FIG. 6, the arrival time at the delivery destination Qn is displayed in an electronic mail EM. When the receiving person selects a button B, the receiving person terminal 30 may display the current position of the delivery person on a map.

In this way, even when the delivery destination is unknown, the estimating system S can estimate the arrival time by inputting feature information on the delivery destination Qn into the learning model, and acquiring the arrival time estimated by the learning model. The details of the estimating system S are now described. In the following description, when it is not particularly required to refer to the drawings, the reference symbols of the delivery destinations and the like may be omitted.

3. Functions to be Implemented in Estimating System

Figure 7:
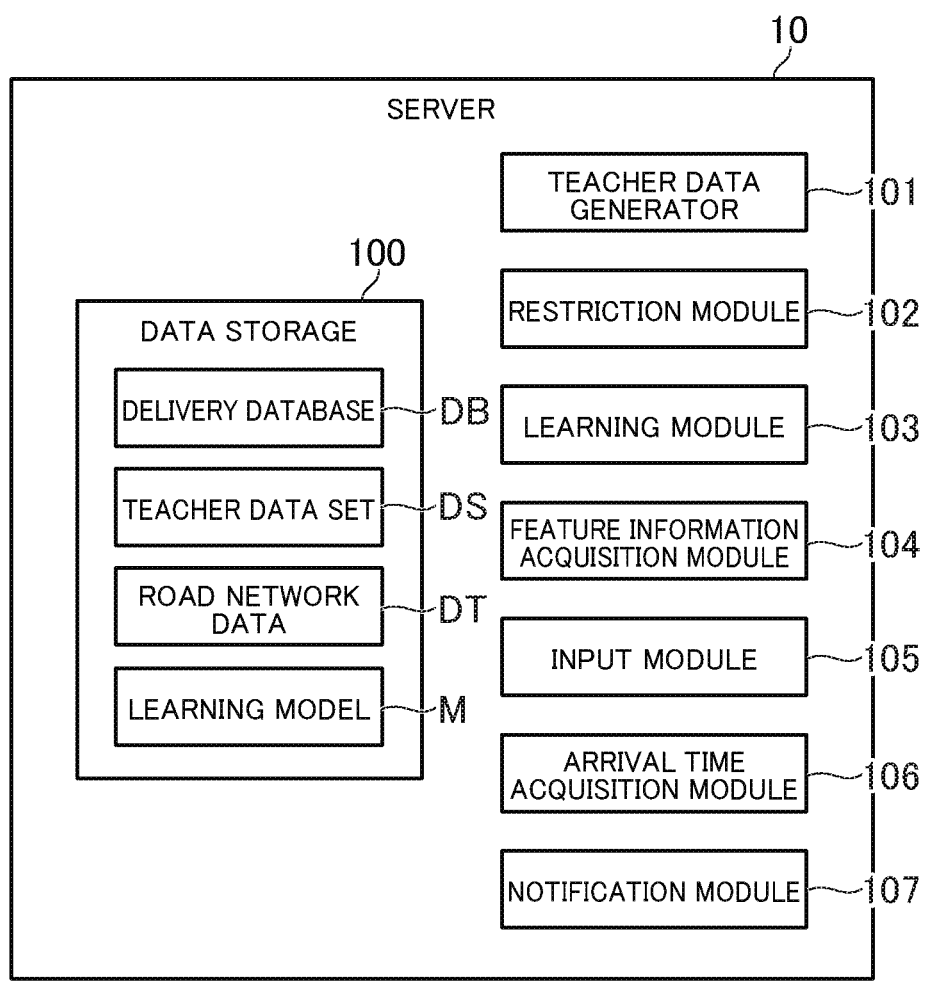
FIG. 7 is a functional block diagram for illustrating an example of functions to be implemented by the estimating system.

FIG. 7 is a functional block diagram for illustrating an example of functions to be implemented in the estimating system S. As illustrated in FIG. 7, in the estimating system S, a data storage 100, a teacher data generator 101, a restriction module 102, a learning module 103, a feature information acquisition module 104, an input module 105, an arrival time acquisition module 106, and a notification module 107 are implemented. In at least one embodiment, there is described a case in which each of those functions is implemented by the server 10.

[3-1. Data Storage]

The data storage 100 is implemented mainly by the storage 12. The data storage 100 is configured to store data required to execute the processing described in at least one embodiment. As examples of the data stored in the data storage 100, there are described a delivery database DB, a teacher data set DS, road network data DT, and a learning model M.

Figure 8:
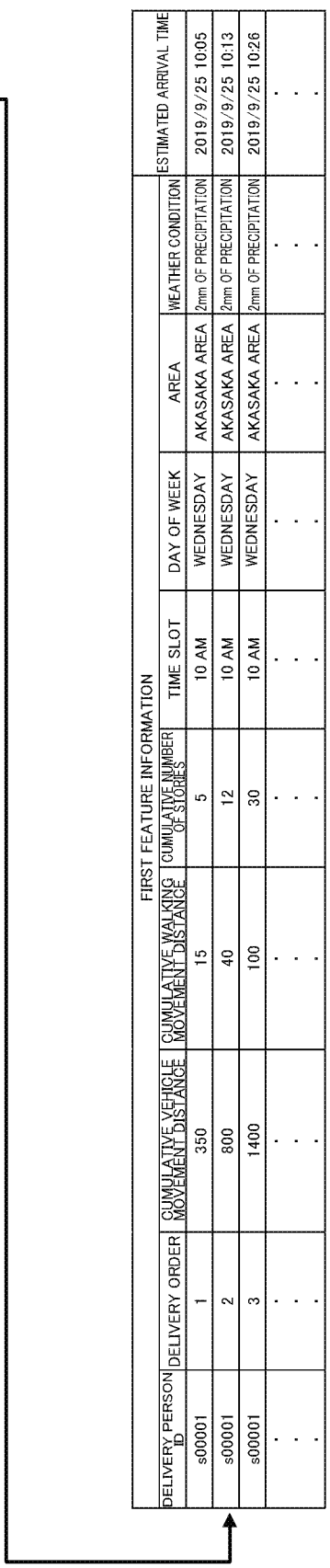
FIG. 8 is a table for showing a data storage example of a delivery database.

FIG. 8 is a table for showing a data storage example of the delivery database DB. As shown in FIG. 8, the delivery database DB is a database in which information on deliveries is stored. For example, in the delivery database DB, there are stored a package ID for uniquely identifying a package, a name of a receiving person, a position of a delivery destination, a desired delivery date and time designated by the receiving person, a delivery status, an electronic mail address of the receiving person, an actual arrival time, a position of the place at which an arrival completion operation is performed, first feature information, and an estimated arrival time.

The package ID is issued by the server 10 every time a package to be delivered is added. When the server 10 issues the package ID, the server 10 creates a new record in the delivery database DB, and stores the package ID, a name of the receiving person, a position of the delivery destination, a desired delivery date and time designated by the receiving person, a delivery status, and an electronic mail address (email address) of the receiving person. For example, the position of the delivery destination and the like are input by a delivery administrator. The position of the delivery destination may be any information that allows identification of a place on Earth, and may be, for example, an address, latitude and longitude, or coordinates. In at least one embodiment, there is described a case in which both the address and the latitude and longitude are stored as the position of the delivery destination.

The delivery status is information indicating a delivery situation of the package. In at least one embodiment, there is described a case in which there are prepared three statuses, namely, "now delivering", "delivery complete", and "delivery incomplete", but other statuses may exist. For example, the status is changed by the delivery person performing a predetermined operation from the delivery person terminal 20. When the package is provided with a barcode or a two-dimensional code, a code reader may be included on the delivery person terminal 20 and the status may be changed by the delivery person reading the barcode or the two-dimensional code.

The actual arrival time is the time at which the delivery person actually arrived at the delivery destination. In other words, the actual arrival time is the time taken to arrive. In at least one embodiment, there is described a case in which the actual arrival time indicates an elapsed time since the delivery person departed, but as long as the actual arrival time is identifiable, the actual arrival time may show, for example, the arrival date and time. For example, when the delivery person performs a predetermined arrival completion operation from the operation device 24 of the delivery person terminal 20, the server 10 is notified to that effect. The server 10 stores a time of day at which the delivery person departed, and stores the time taken until the notification is received as the actual arrival time. When the delivery person forgets to perform the arrival completion operation at the delivery destination and performs the arrival completion operation at a place away from the delivery destination, an incorrect actual arrival time may be registered. In at least one embodiment, the restriction module 102 described later is configured to inhibit the learning model M from undesirably learning an incorrect actual arrival time.

The position of the place at which the arrival completion operation has been performed is the position of the delivery person terminal 20 when the delivery person terminal 20 received the arrival completion operation. This position is used to estimate whether or not the delivery person has forgotten to perform the arrival completion operation at the delivery destination. In at least one embodiment, when the delivery person performs the arrival completion operation, the delivery person terminal 20 transmits position information detected by the position detector 26 to the server 10. The server 10 stores the position indicated by the received position information as the position of the place at which the arrival completion operation has been performed. For example, when the position detector 26 includes a GPS sensor, latitude and longitude information on the delivery person terminal 20 obtained when the arrival completion operation has been performed is stored.

The first feature information is feature information on the delivery destination. In at least one embodiment, there exist feature information on the delivery destination to which the delivery person is going to deliver from now and feature information on the delivery destination to which a delivery has been already completed. Therefore, the former example of feature information is referred to as "first feature information", and the latter example of feature information is referred to as "second feature information". Further, the former example of the delivery destination is referred to as "first delivery destination", and the latter example of the delivery destination is referred to as "second delivery destination".

The first feature information is feature information input to the learning model M. The first feature information is feature information on a first delivery destination for which an arrival time is to be estimated. The second feature information is feature information included in the teacher data set DS to be learned by the learning model. The second feature information is feature information on a second delivery destination for which the actual arrival time has been acquired. The first feature information stored in the delivery database DB is used as a part of the teacher data set DS when the delivery is completed, and is therefore treated as second feature information. That is, a first delivery destination for which delivery has been completed is treated as a second delivery destination.

For example, of the first feature information, the delivery person ID, the delivery order, the time slot, the day of the week, the area, and the weather condition are input by the delivery administrator. In place of being input by the administrator, those pieces of information may be acquired from another computer that can communicate to and from the server 10. For example, the time slot and the day of the week may be acquired from an electronic commerce system that sells a product being the package. As another example, the weather condition may be acquired from a system installed in a meteorological agency or a private company. As the weather condition, any information, such as the weather, temperature, amount of precipitation, humidity, or typhoon information is usable. The delivery order may be input by the delivery person or the administrator, or may be automatically determined based on a desired delivery date and time, a route search algorithm, or the like.

In at least one embodiment, of the first feature information, the server 10 calculates the cumulative vehicle movement distance, the cumulative walking movement distance, and the cumulative number of stories. The server 10 refers to the road network data DT and calculates as the vehicle movement distance, for each first delivery destination, a distance between the first delivery destination on the delivery route R and the immediately preceding first delivery destination. The server 10 refers to the delivery database DB, and calculates the cumulative vehicle movement distance by adding up, for each first delivery destination, the vehicle movement distance of the first delivery destination and the vehicle movement distances of the other first delivery destinations that are via points.

The server 10 refers to the road network data DT, and calculates as the walking movement distance, for each first delivery destination, a round-trip distance or a one-way distance between a stop position or a parking position at which the delivery vehicle is estimated to stop near the first delivery destination and the position of the first delivery destination. The stop position or the parking position may be identified by a method determined in advance. In at least one embodiment, the stop position or the parking position is the nearest road. In this case, the server 10 calculates, as the walking movement distance, the distance between the position of the road closest to the first delivery destination and the position of the first delivery destination. The server 10 refers to the delivery database DB, and calculates the cumulative walking movement distance by adding up, for each first delivery destination, the walking movement distance of the first delivery destination and the walking movement distances of the other first delivery destinations that are via points.

The server 10 refers to the road network data DT, and acquires the number of stories of the building at the first delivery destination. In at least one embodiment, it is assumed that the number of stories of the building at each point on the map is stored in the road network data DT. The server 10 calculates the cumulative number of stories by adding up, for each first delivery destination, the number of stories of the building at the first delivery destination and the numbers of stories of the buildings at the other first delivery destinations that are via points.

FIG. 9 is a table for showing a data storage example of the teacher data set DS. As shown in FIG. 9, the teacher data set DS includes teacher data for causing the learning model M to perform learning. The teacher data may also be referred to as "training data" or "learning data". In the teacher data, pairs indicating a relationship between inputs (questions) and outputs (answers) are shown. In at least one embodiment, each pair is referred to as "teacher data", and a group of pairs is referred to as a "teacher data set DS". The number of pieces of teacher data included in the teacher data set DS may be any number, and may be, for example, several tens to several tens of thousands, or more. The teacher data is a pair in which the second feature information on the second delivery destination is an input and the actual arrival time at the second delivery destination is an output.

The data storage 100 stores the road network data DT. The road network data DT is data having various information on roads as attributes. For example, the road network data DT contains a regulated speed, a road width, a link travel time (distance between points), the number of lanes, and the like as attributes. The road network data DT may also be referred to as "geographic information system (GIS) data". The road network data DT itself is not shown because known data may be used.

In at least one embodiment, itis assumed that the road network data DT includes features about each point on the map. For example, for each point, an attribute of the region to which the point belongs and an attribute of the building at the point are stored in the road network data DT. The region attribute is a classification of a "region" to which the place belongs, and, for example, may be an attribute relating to a population size, such as "urban" or "rural", or an attribute relating to an amount of traffic. The region attribute may be, for example, an area, a building density, or a road congestion level. The building attribute is a classification of the building, and may be, for example, the number of stories of the building, the building's type, the number of rooms, presence or absence of an elevator, or a site area.

In at least one embodiment, there is described a case in which the feature, such as the region attribute or the building attribute, is stored in the road network data DT, but the feature may be stored in another database or input by the administrator. In at least one embodiment, the road network data DT also includes the map data, but the road network data DT may be separate from the map data.

The data storage 100 also stores a program (algorithm), a parameter, and the like of the learning model M. In this example, there is described a case in which a learning model M that has performed learning (whose parameter has been adjusted) by the teaching data set DS is stored in the data storage 100, but a pre-learning learning model M (before parameter adjustment) may be stored in the storage 100.

[3-2. Teacher Data Generator]

The teacher data generator 101 is implemented mainly by the controller 11. The teacher data generator 101 is configured to acquire the arrival time at each second delivery destination and generate teacher data based on the arrival completion operation performed in the past when the delivery person (delivery person going to move from now or delivery person who is now in motion) or another delivery person (delivery person different from the delivery person going to move from now or delivery person who is now in motion) moved to each second delivery destination.

The arrival completion operation may be any operation that can be input by the delivery person. Examples of the arrival completion operation may include an operation of selecting a button of the operation device 24, an operation of selecting an image displayed on the display 25 with the operation device 24, and an operation of reading with a code reader a code printed on a delivery slip. As described above, when the arrival completion operation is performed, the actual arrival time and the position of the place at which the arrival completion operation is performed are stored in the delivery database DB.

For example, as the second feature information, the teacher data generator 101 acquires, of the first feature information stored in the delivery database DB, the first feature information in which the actual arrival time is registered. The teacher data generator 101 acquires, as teacher data, a pair in which the acquired second feature information is an input and the actual arrival time stored in the delivery database DB is an output. The teacher data generator 101 acquires teacher data for each record having a delivery status indicating that delivery is complete, and records the teacher data set DS in the data storage 100. The teacher data set DS may also be created manually by the administrator. In this case, the teacher data generator 101 generates the teacher data set DS based on the input details from the terminal operated by the administrator.

[3-3. Restriction Module]

The restriction module 102 is implemented mainly by the controller 11. The restriction module 102 is configured to restrict the learning model M so as to avoid learning a relationship (relationship between the second feature information and arrival time) in which the distance between each second delivery destination and the place at which the arrival completion operation corresponding to the second delivery destination has been performed becomes equal to or more than a threshold value. The restriction module 102 refers to the delivery database DB, and acquires, as the second delivery destination, a first delivery destination in which the actual arrival time has been registered. The restriction module 102 calculates the distance between the second delivery destination and the place at which the arrival completion operation corresponding to the second delivery destination has been performed. This distance may be a straight-line distance, or when a walking route is identifiable, may be a distance on the walking route.

The restriction module 102 determines whether or not the calculated distance is equal to or more than the threshold value. The threshold value may be a fixed value or a variable value. It is assumed that the threshold value is stored in the data storage 100. The restriction module 102 inhibits the information on a second delivery destination having a distance equal to or more than the threshold value from being included in the teacher data set DS. For example, the restriction module 102 inhibits the teacher data generator 101 from generating teacher data for the second delivery destination having a distance equal to or more than the threshold value. The restriction module 102 may also perform the restriction by another method. For example, the restriction module 102 may generate teacher data corresponding to a second delivery destination having a distance equal to or more than the threshold value, but exclude the teacher data from the learning processing. As another example, the restriction module 102 may lower the learning coefficient of the teacher data. As yet another example, the restriction module 102 may delete the teacher data from the teacher data set DS.

[3-4. Learning Module]

The learning module 103 is mainly implemented by the controller 11. The learning module 103 is configured to cause the learning model M to learn teacher data. The learning module 103 executes learning processing of the learning model M based on the teacher data included in the teacher data set DS. A method used in known machine learning can be used as the learning processing itself. For example, a method used in a neural network, reinforcement learning, or deep learning may be used. The learning module 103 adjusts the parameters of the learning model M so as to obtain a relationship between the inputs and the outputs of the teacher data. In at least one embodiment, the teacher data is a pair in which the second feature information on the second delivery destination is an input and the actual arrival time at the second delivery destination is an output, and therefore the learning module 103 causes the learning model M to learn the relationship between those inputs and outputs.

[3-5. Feature Information Acquisition Module]

The feature information acquisition module 104 is implemented mainly by the controller 11. The feature information acquisition module 104 is configured to acquire first feature information on each of a plurality of first delivery destinations to which the delivery person is to move in order. In at least one embodiment, the first feature information is stored in the delivery database DB, and therefore the feature information acquisition module 104 acquires the first feature information by referring to the delivery database DB. When the first feature information is stored in an external computer other than the server 10, the feature information acquisition module 104 transmits to the external computer a request to refer to the first feature information, and acquires the first feature information from the external computer. The first feature information may be input to a computer such as the delivery person terminal 20, and the feature information acquisition module 104 may acquire the input first feature information.

The delivery person is an example of a "mobile object" in at least one embodiment of the present disclosure. The mobile object is an object that can move on Earth. For example, the mobile object is a user who moves in a vehicle. The delivery person is an example of the user, and the delivery vehicle is an example of the vehicle. In at least one embodiment, the mobile object and another mobile object are each the delivery person or the delivery vehicle. However, when deliveries are to be performed by using an unmanned aerial vehicle or an unmanned vehicle, the unmanned aerial vehicle or the unmanned vehicle may correspond to the mobile object. As another example, when the estimating system S is used in a situation other than deliveries, the mobile object may be a person who moves or a vehicle that moves in the situation. For example, in a case where the estimating system S is used for navigation when a person moves on foot, the mobile object is the person who moves on foot. In the description of at least one embodiment, each of the terms "delivery person" and "delivery vehicle" may be read as "mobile object".

The first delivery destination is an example of a "first place" in at least one embodiment of the present disclosure. The first place is the place of the movement destination of the mobile object. In other words, the first place is a destination point of the mobile object or a place on the movement route. The first place may also be a via point of another first place. The first place is not limited to a delivery destination, and may be any place. For example, when the estimating system S is to be used in a situation of collecting packages, the first place may be a collection destination. As another example, in a case where the estimating system S is to be used for navigation when a person moves on foot, the first place may be a movement destination of the person who moves on foot. In the description of at least one embodiment, the term "first delivery destination" may be read as a "first place".

In at least one embodiment, the first feature information on each first delivery destination includes a first cumulative value corresponding to another first delivery destination that is a via point. The another first delivery destination is a delivery destination through which the delivery person is to pass on the way, and is a delivery destination placed earlier in the delivery order. The first cumulative value is the cumulative value of the values indicated by the first feature information on the other first delivery destinations that are via points. The term "cumulative value" can also be referred to as a total value, an accumulated value, or a sum value. The cumulative value may be a simple cumulative value or a cumulative value in which a predetermined weight has been considered. For example, the first feature information on each delivery destination includes, as the first cumulative value, a first cumulative movement amount measured since the delivery person got off the delivery vehicle.

The first cumulative movement amount is the movement amount that the delivery person moves by his or her own feet. The movement amount may be a two-dimensional (planar) movement amount or a three-dimensional (3D) movement amount. The movement amount is not limited to the distance, and may be expressed in some other manner as long as the amount that the delivery person moves is indicated. For example, the number of stories of a building may correspond to the movement amount. As another example, the site area of the delivery destination may correspond to the movement amount. The first feature information on each delivery destination includes, as the first cumulative movement amount, for example, a first cumulative walking movement distance that the user has moved on foot since getting off the vehicle. Further, for example, the first feature information on each delivery destination includes, as the first cumulative movement amount, a first cumulative number of stories of the building to which the user has moved since getting off the vehicle.

The first cumulative movement amount is not limited to the first cumulative walking movement distance and the first cumulative number of stories. For example, the first cumulative movement amount may be a cumulative value of the site area. As another example, the first cumulative movement amount may be the cumulative value of the distance from an entrance to the first delivery destination. The first cumulative value is not limited to the first cumulative movement amount that the delivery person has moved since getting off the delivery vehicle. For example, a first cumulative vehicle movement distance may correspond to the first cumulative value. Further, for example, the first cumulative value may be a cumulative value of time, such as a movement time period to the delivery destination or a staying time period at the delivery destination.

[3-6. Input Module]

The input module 105 is implemented mainly by the controller 11. The input module 105 is configured to input the first feature information on each first delivery destination to the learning model M, which has learned a relationship between the second feature information on each of a plurality of second delivery destinations to which a delivery person (delivery person going to move from now or delivery person who is now in motion) or another delivery person (delivery person different from the delivery person going to move from now or delivery person who is now in motion) has moved in order in the past and the arrival time at each of those second delivery destinations.

The second delivery destination is an example of the "second place" in at least one embodiment of the present disclosure. The second place is the place of a movement destination to which movement has been completed in the past. In other words, the second place is a destination point of a mobile object for which movement has been completed in the past, a point on a past movement route, or a point for which an actual arrival time has been registered. The second place may also be a via point of another second place. The second place is not limited to a delivery destination, and may be any place. For example, when the estimating system S is to be used in a situation of collecting packages, the second place may be a collection destination. As another example, in a case where the estimating system S is to be used for navigation when a person moves on foot, the second place may be a movement destination of the person who moved on foot. In the description of at least one embodiment, the term "second delivery destination" may be read as a "second place".

The first feature information and the second feature information have the same data format, and also have the same number of feature items. In at least one embodiment, a first delivery destination for which an actual arrival time has been registered becomes a second delivery destination, and the first feature information on the first delivery destination becomes second feature information. Therefore, the second feature information on each second delivery destination includes a second cumulative value corresponding to another second delivery destination that is a via point. The details of the second cumulative value are the same as the details of the first cumulative value, and hence the word "first" in the description of the first cumulative value may be replaced with the word "second".

For example, the second feature information on each second delivery destination includes, as the second cumulative value, a second cumulative movement amount measured since the delivery person got off the delivery vehicle. As another example, the second feature information on each second delivery destination includes, as the second cumulative movement amount, a second cumulative walking movement distance that the delivery person has moved on foot since getting off the delivery vehicle. As yet another example, the second feature information on each second delivery destination includes, as the second cumulative movement amount, a second cumulative number of stories to which the delivery person has moved since getting off the delivery vehicle. The details of each of the second cumulative movement amount, the second cumulative walking movement distance, and the second cumulative number of stories are the same as the details of the first cumulative movement amount, the first cumulative walking movement distance, and the first cumulative number of stories, respectively, and hence the word "first" in the description of the first cumulative movement amount, the first cumulative walking movement distance, and the first cumulative number of stories may be replaced with the word "second".

[3-7. Arrival Time Acquisition Module]

The arrival time acquisition module 106 is implemented mainly by the controller 11. The arrival time acquisition module 106 is configured to acquire the arrival time at each first delivery destination estimated by the learning model M. When the first feature information is input by the input module 105, the learning model M estimates and outputs the arrival time corresponding to the first feature information. The learning model M may directly use the value indicated by the first feature information as the feature amount, or may convert the value indicated by the first feature information into a multidimensional vector and use the multidimensional vector as the feature amount. The learning model M calculates an arrival time corresponding to the feature amount, and outputs the calculated arrival time as an estimation result. The arrival time acquisition module 106 stores the estimated arrival time in the delivery database DB based on the acquired arrival time.

In at least one embodiment, the learning model M outputs, as the arrival time, the time to be required by the delivery person after departure until arrival. Therefore, the arrival time acquisition module 106 acquires a date and time obtained by adding the arrival time to the current date and time as the estimated arrival time. The learning model M may output the arrival date and time at the first delivery destination as the arrival time. In this case, the arrival time acquisition module 106 acquires the acquired arrival date and time as the estimated arrival time without changing the arrival date and time. The estimated arrival time may be indicated only as a time of day in place of the date and time. The time of day may be indicated in terms of hours, minutes, and seconds, or only in terms of hours and minutes. Further, the estimated arrival time may indicate a certain point in time, or may indicate a time slot having a certain length.

[3-8. Notification Module]

The notification module 107 is implemented mainly by the controller 11. The notification module 107 is configured to notify, before the delivery person arrives at each first delivery destination, a notification destination associated with the first delivery destination of the estimated arrival time at the first delivery destination. The notification destination associated with the first delivery destination may be any notification destination determined based on the first delivery destination, and may be, for example, a receiving person who is at the first delivery destination or a person who is not at the first delivery destination. The notification module 107 notifies the notification destination of the arrival time before the delivery person arrives at the first delivery destination.

In at least one embodiment, there is described a case in which a notification using electronic mail is described as an example, but the notification may be performed by any method. For example, a message application, an SNS, a push notification on the receiving person terminal 30, or a notification in an application installed on the receiving person terminal 30 may be used. Further, in at least one embodiment, there is described a case in which a visual notification is performed, but an aural notification may be performed by using sound, such as in a telephone call or a voice mail, or a tactile notification may be performed by using a vibrator or the like.

The notification module 107 may perform the notification at any timing, for example, when an arrival time is approaching, when the delivery person is approaching the delivery destination, or when an application of the receiving person terminal 30 has been activated. As another example, the notification module 107 may immediately perform a notification of the arrival time as soon as the arrival time is estimated, or the notification may be performed when a predetermined time has come.

4. Processing to be Executed in at Least One Embodiment

Next, processing to be executed in at least one embodiment is described. Here, a description is given of learning processing of generating a teacher data set DS and causing the learning model M to perform learning, and estimation processing of estimating the arrival time at a first delivery destination.

[4-1. Learning Processing]

Figure 10:
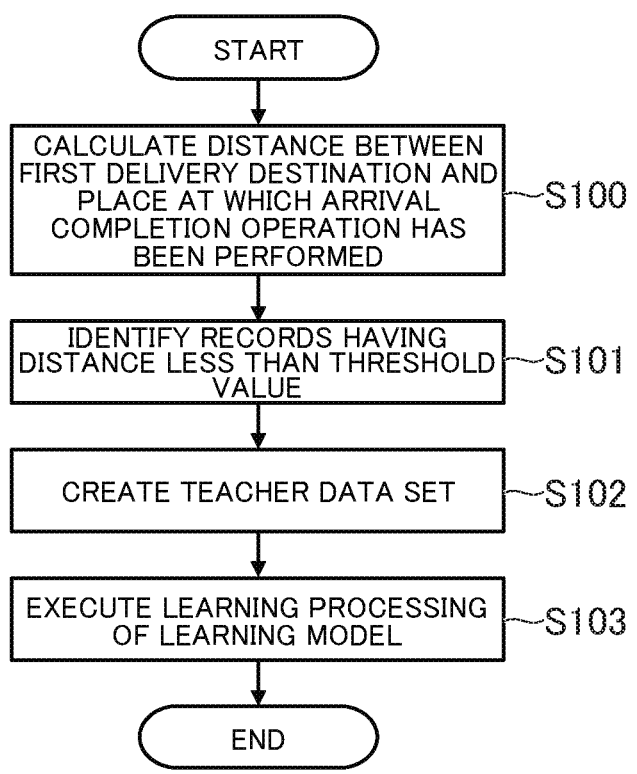
FIG. 10 is a flowchart for illustrating an example of learning processing.

FIG. 10 is a flowchart for illustrating an example of learning processing. As illustrated in FIG. 10, the learning processing is executed by the controller 11 operating in accordance with programs stored in the storage 12. The learning processing is an example of the processing to be executed by the functional blocks illustrated in FIG. 7. The learning processing may be executed at any timing. For example, the learning processing may be executed as batch processing overnight, or may be executed when the administrator performs a predetermined operation.

As illustrated in FIG. 10, first, the server 10 refers to the delivery database DB and calculates the distance between the first delivery destination and the place at which the arrival completion operation has been performed (Step S100). In Step S100, the server 10 calculates the distance for each recording which an actual arrival time has been registered. This distance may be a straight-line distance between the latitude and longitude or coordinates indicated by the first delivery destination and the latitude and longitude or coordinates indicated by the place at which the arrival completion operation has been performed.

The server 10 identifies records in the delivery database DB in which the distance calculated in Step S100 is less than a threshold value (Step S101). In Step S101, the server 10 determines whether or not the distance calculated in Step S100 is less than the threshold value.

The server 10 creates the teacher data set DS based on the records identified in Step S101 (Step S102). In Step S102, the server 10 acquires the first feature information on the records in which the distance calculated in Step S100 is less than the threshold value as second feature information. The server 10 acquires, as teacher data, a pair of the acquired second feature information and the actual arrival time in the record. That is, the server 10 does not generate teacher data for records in which the distance calculated in Step S100 is equal to or more than the threshold value. The server 10 acquires, as the teacher data set DS, a group of the teacher data of the records in which the distance calculated in Step S100 is less than the threshold value.

The server 10 executes, based on the teacher dataset DS created in Step S102, learning processing of the learning model M (Step S103), and then ends this processing. In Step S103, the server 10 uses a known supervised machine learning method to adjust the parameter of the learning model M so as to obtain the relationship between the input and the output indicated by the pair of the teacher data.

[4-2. Estimation Processing]

Figure 11:
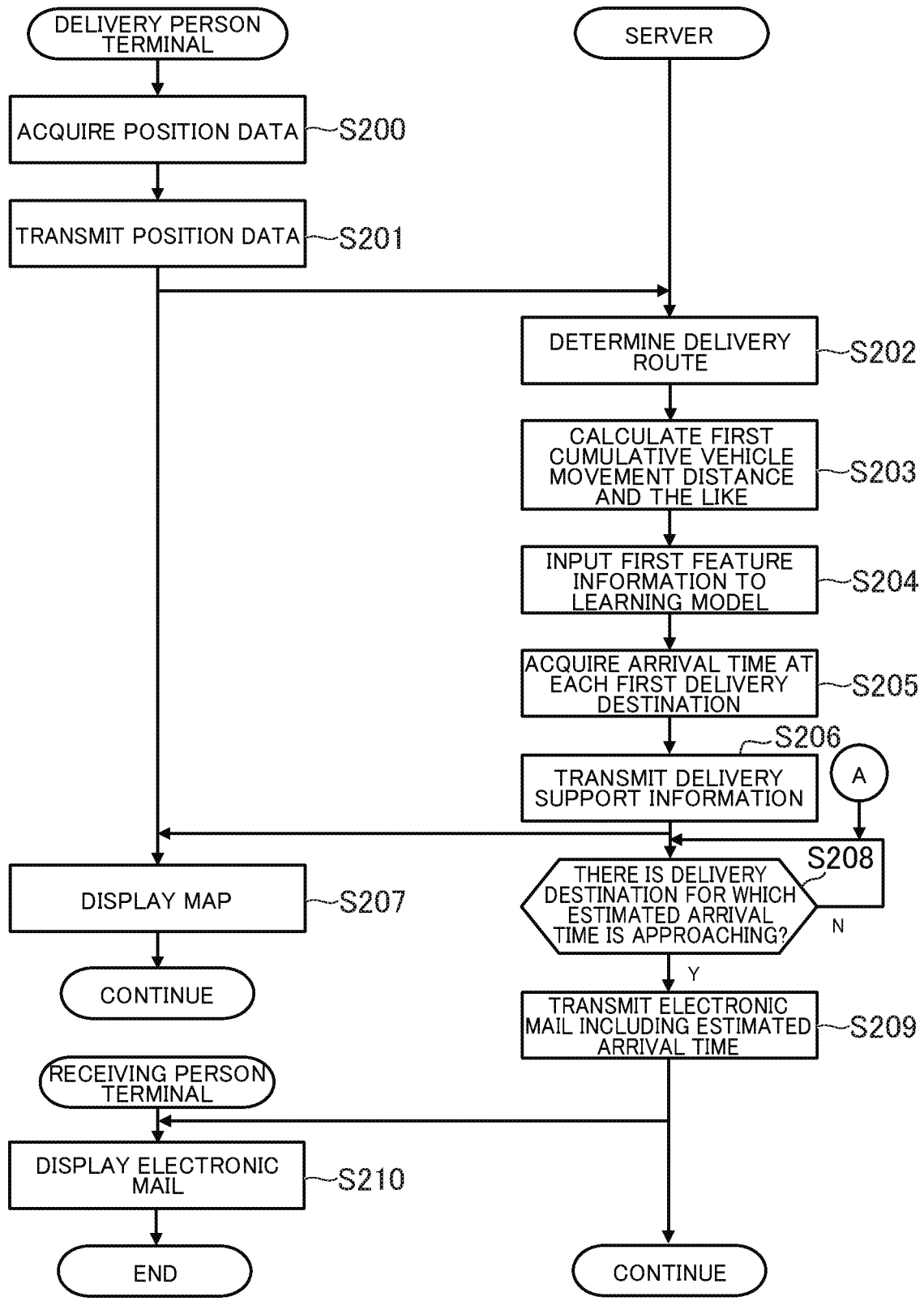
FIG. 11 is a flowchart for illustrating an example of estimation processing.
Figure 12:
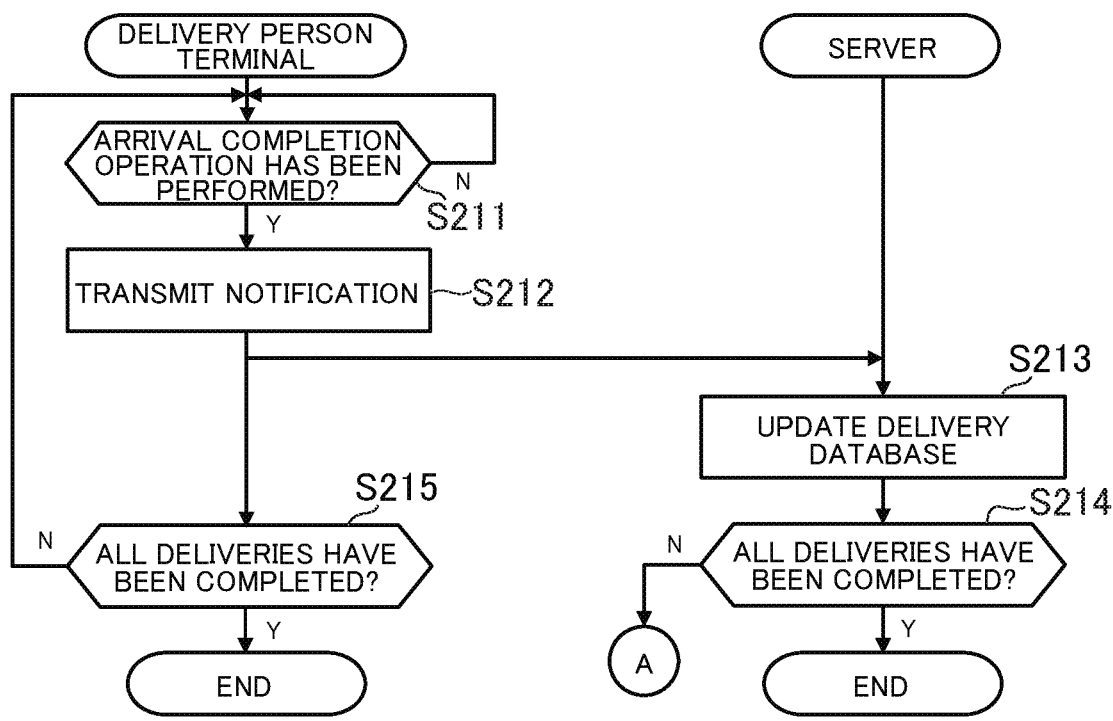
FIG. 12 is a flowchart for illustrating an example of estimation processing.

FIG. 11 and FIG. 12 are flowcharts for illustrating an example of estimation processing. The processing illustrated in FIG. 11 and FIG. 12 is executed by the controllers 11, 21, and 31 operating in accordance with programs stored in the storages 12, 22, and 32. The processing described below is an example of the processing to be executed by the functional blocks illustrated in FIG. 7. The processing of FIG. 7 may be executed at any timing, for example, when the delivery person departs for delivery with the delivery person terminal 20. It is assumed that, of the first feature information on the delivery database DB, the information other than the cumulative vehicle movement distance, the cumulative walking movement distance, and the cumulative number of stories is stored in advance.

As illustrated in FIG. 11, first, the delivery person terminal 20 acquires, based on the detection signal of the position detector 26, position data indicating the current position of the delivery person (Step S200). In Step S200, the controller 21 acquires, based on a signal from a satellite received by the position detector 26, position data indicating the current latitude and longitude.

The delivery person terminal 20 transmits the position data acquired in Step S200 to the server 10 (Step S201). In the storage 22 of the delivery person terminal 20, the delivery person ID is stored, and in Step S201, the controller 21 transmits the position data together with the delivery person ID. In this way, the server 10 can identify the delivery person terminal 20 of the delivery person from which the position data is received.

When the server 10 receives the position data from the delivery person terminal 20, the server 10 determines the delivery route R of the delivery person based on the position data, the delivery database DB, and the road network data DT (Step S202). In Step S202, the server 10 determines, based on a known route search algorithm, the delivery route R for moving from the position indicated by the latest position data to each delivery destination in an order stored in the delivery database DB.

The server 10 calculates the first cumulative vehicle movement distance, the first cumulative walking movement distance, and the first cumulative number of stories of each first delivery destination based on the delivery route R and the road network data DT (Step S203). In Step S203, the server 10 acquires the vehicle movement distance, the walking movement distance, and the number of stories for each first delivery destination. The server 10 calculates, for each first delivery destination, the cumulative values of: the vehicle movement distance, the walking movement distance, and the number of stories of the first delivery destination; and the vehicle movement distances, the walking movement distances, and the numbers of stories of the other first delivery destinations that are via points, respectively. The server 10 stores the first cumulative vehicle movement distance, the first cumulative walking movement distance, and the first cumulative number of stories of each first delivery destination in the delivery database DB, to thereby complete the generation of the first feature information.

The server 10 inputs the first feature information on each first delivery destination to the learning model M (Step S204). The learning model M estimates and outputs the arrival time based on the input first feature information. The server 10 acquires the arrival time at each first delivery destination estimated by the learning model M (Step S205). In Step S205, the server 10 adds the arrival time at each first delivery destination to the current date and time, and stores the resultant date and time as the estimated arrival time in the delivery database DB. The server 10 transmits delivery support information including the delivery route R determined in Step S202 and the estimated arrival time at each first delivery destination to the delivery person terminal 20 (Step S206).

When the delivery person terminal 20 receives the delivery support information, the delivery person terminal 20 displays the map MP on the display 25 (Step S207). In Step S207, the delivery person terminal 20 displays the delivery route R and the estimated arrival time at each first delivery destination that are included in the delivery support information on the map MP. The data of the map MP may be stored in advance in the storage 22 of the delivery person terminal 20, or may be provided from the server 10 to the delivery person terminal 20.

In the server 10, the controller 11 determines whether or not there is a first delivery destination for which the estimated arrival time is approaching (Step S208). In Step S208, the controller 11 acquires the current time by using a real-time clock or the like.

The controller 11 determines whether or not there is an arrival time within a predetermined time from the current time in the delivery database DB.

When there is a first delivery destination for which the arrival time is approaching (Step S208: Y), the server 10 transmits, based on the delivery database DB, an electronic mail including the arrival time to the receiving person of the first delivery destination for which the arrival time is approaching (Step S209). In Step S209, the server 10 refers to the delivery database DB and acquires the electronic mail address of the receiving person of the first delivery destination for which the arrival time is approaching. The server 10 transmits an electronic mail including the arrival time to the electronic mail address. It is assumed that the format of the electronic mail is stored in advance in the storage 12.

When the receiving person terminal 30 receives the electronic mail, the receiving person terminal 30 displays the received electronic mail on the display 35 (Step S210). In Step S210, the screen illustrated in FIG. 6 is displayed, and the receiving person can grasp the precise arrival time.

Referring next to FIG. 12, the delivery person terminal 20 determines, based on the detection signal from the operation device 24, whether or not the arrival completion operation has been performed (Step S211). The arrival completion operation is performed, for example, when the delivery of the package at the delivery destination is complete, or when the delivery person visited the delivery destination but the receiving person is absent. It is assumed that information for identifying the delivery status is included in the arrival completion operation. From the delivery database DB, the data on the delivery for which the delivery person is responsible is assumed to have been downloaded to the delivery person terminal 20. For this reason, the delivery person terminal 20 can identify the first delivery destination and the like at which the arrival completion operation is to be performed.

When it is determined that the arrival completion operation has been performed (Step S211: Y), the delivery person terminal 20 transmits to the server 10 a notification indicating that the arrival completion operation has been performed (Step S212). It is assumed that the notification includes the package ID of the package for which the arrival completion operation has been performed, information for identifying a status designated by the delivery person, and the current position of the delivery person terminal 20. The current position is acquired by the position detector 26.

When the server 10 receives the notification, the server 10 updates the delivery database DB (Step S213). In Step S213, the server 10 stores the status included in the notification, the actual arrival time corresponding to the current time of day, and the current position of the delivery person terminal 20 in the record in which the package ID included in the notification is stored. For example, the server 10 records in the storage 12 a time of day at which the position data transmitted in Step S201 was received, and calculates a difference between the recorded time of day and the current time of day as the actual arrival time. After having performed the arrival completion operation, the delivery person departs for the next delivery destination.

The controller 11 determines, based on the delivery database DB, whether or not all the deliveries have been completed (Step S214). In the delivery person terminal 20, the controller 21 determines whether or not all the deliveries have been completed based on the data on the deliveries for which the delivery person is responsible in the delivery database DB (Step S215). In Step S214 and Step S215, the controller 11 determines whether or not the status of all the packages is a status other than "in motion".

When there exists a delivery that has not yet been completed (Step S214 and Step S215: N), the processing returns to Step S211 and the arrival completion operation is received by the delivery person terminal 20. Meanwhile, when it is determined that all the deliveries have been completed (Step S214 and Step S215: Y), this processing ends.

With the estimating system S described above, through inputting the first feature information on each first delivery destination to the learning model M, which has learned the relationship between the second feature information on the second delivery destination and the actual arrival time at the second delivery destination, and acquiring the arrival time at each first delivery destination estimated by the learning model, the arrival time can be estimated by using the first feature information even when the delivery person is to move to an unknown place. The learning model M may also estimate the arrival time at a known place (place shown in the teacher data set DS). In this case, even when the movement conditions (for example, time slot or day of the week) to a known place are different, the learning model M can estimate the arrival time with high accuracy.

The estimating system S can simplify the processing of estimating the arrival time at each first distribution destination by including a first cumulative value corresponding to another first delivery destination that is a via point in the first feature information on each first delivery destination, and including a second cumulative value corresponding to another second delivery destination that is a via point in the second feature information on each second delivery destination. For example, when calculating a movement time period between a certain first delivery destination and the next first delivery destination, or when calculating a staying time period at each first delivery destination, processing of obtaining a total of the movement time period or the staying time period is carried out, and as a result, the processing of estimating the arrival time becomes complicated. However, the estimating system S can use the first feature information to estimate the arrival times all at once, to thereby be able to simplify the processing. As a result, the processing of estimating the arrival time can be sped up, and the processing load on the server 10 can be reduced as well.

Further, through including a first cumulative movement amount measured since the user got off the vehicle as the first cumulative value in the first feature information on each first delivery destination and including a second cumulative movement amount measured since the user got off the vehicle as the second cumulative value in the second feature information on each second delivery destination, the arrival time can be estimated in consideration of the movement amount measured since the delivery person got off the vehicle as well, and as a result, the estimation accuracy of the arrival time can be increased.

In addition, through including a first cumulative walking movement distance that the user has moved on foot since getting off the vehicle as the first cumulative movement amount in the first feature information on each first delivery destination, and including a second cumulative walking movement distance that the user has moved on foot since getting off the vehicle as the second cumulative movement amount in the second feature information on each second delivery destination, the arrival time can be estimated in consideration of the distance that the delivery person has moved on foot, and as a result, the estimation accuracy of the arrival time can be increased.

Further, through including a first cumulative number of stories of the building to which the user has moved since getting off the vehicle as the first cumulative movement amount in the first feature information on each first delivery destination, and including a second cumulative number of stories of the building to which the user has moved since getting off the vehicle as the second cumulative movement amount in the second feature information on each second delivery destination, the arrival time can be estimated in consideration of the movement of the delivery person in the building, and as a result, the estimation accuracy of the arrival time can be increased.

Further, the estimating system S can increase the accuracy of the learning model M by generating teacher data by acquiring an arrival time at a second delivery destination based on an arrival completion operation performed in the past when the delivery person moved to each second delivery destination for a delivery, and updating the teacher data based on actual measurement values.

Further, the estimating system S can prevent the undesirable learning of such an incorrect actual arrival time as acquired when the delivery person forgets to perform the arrival completion operation at the delivery destination, by restricting the learning model so as to avoid learning a relationship in which the distance between each second delivery destination and the place at which the arrival completion operation corresponding to the second destination has been performed becomes equal to or more than the threshold value. That is, the accuracy of the learning model M can be increased by eliminating teacher data that may become noise.

Further, the estimating system S can increase the convenience of the receiving person by notifying, before the delivery person arrives at each first delivery destination, a notification destination associated with the first delivery destination of the arrival time at the first delivery destination.

Further, even when the first delivery destination is an unknown place, the estimating system S can estimate the arrival time, and thereby increase convenience during delivery, by setting each first place to be a first delivery destination and each second place to be a second delivery destination.

5. Modification Examples

The present disclosure is not limited to at least one embodiment described above, and can be modified suitably without departing from the spirit of the present disclosure.

For example, it is not particularly required that the first feature information and the second feature information each include a cumulative value. Further, for example, the features to be included in each of the first feature information and the second feature information are not limited to the examples described in at least one embodiment. For example, each of the first feature information and the second feature information may include another feature such as the presence or absence of an elevator, the age or gender of the delivery person, or the type of delivery vehicle. In addition, for example, each of the first feature information and the second feature information may show only a distance from the departure point of the delivery person to the delivery destination without showing the other information including the cumulative walking movement distance. Still further, for example, there has been described a case in which the actual arrival time indicates the time required since the delivery person departed until the delivery person arrived at the first delivery destination, but the actual arrival time may indicate the time required from any point in time after the delivery person departed until the delivery person arrived at the first delivery destination, or may indicate the time of day at which the delivery person arrived at the first delivery destination. Similarly, the estimated arrival time may indicate the time required since the delivery person departed until the delivery person arrived at the first delivery destination, or the time required from any point in time after the delivery person departed until the delivery person arrived at the first delivery destination.

Further, for example, the processing of acquiring the arrival time may be repeated while the delivery person is in motion, and the latest arrival time may be calculated. In this case, the cumulative vehicle movement distance, the cumulative walking movement distance, and the cumulative number of stories may be updated in accordance with the current position of the delivery person terminal 20 and the delivery status. Still further, for example, there has been described a case in which the arrival time is estimated by acquiring the current position of an in-motion delivery person, but the arrival time for a future delivery of a delivery person who has not yet departed may be estimated. In this case, the arrival time may be estimated based on the place of a sales office or a scheduled departure time of the delivery person, without particularly acquiring the current position of the delivery person. In addition, for example, there has been described a case in which the arrival time estimated by the server 10 is provided to both the delivery person and the receiving person, but the arrival time may be provided to only any one of the delivery person and the receiving person, or may also be provided to another person, for example, the administrator.

Still further, for example, there has been described a case in which position data is acquired from the delivery person terminal 20, which is moving together with the delivery person, but the position data may be acquired from the delivery vehicle or the like. Still further, for example, there has been described a case in which the estimating system S is used in a situation of delivering packages, but the estimating system S may be used in any situation. For example, when the estimating system S is used in a situation of collecting packages, each destination and via point may be a place at which the delivery person collects a package. As another example, when the delivery person is to collect a package and then deliver the package, the destination may be the delivery destination of the package and the via point may be the collection place of the package.

The estimating system S may also be used in a situation not related to packages. For example, the estimating system S may be used for route guidance. In this case, when the user of the estimating system S inputs a destination and a via point from his or her own terminal, the server 10 estimates the arrival time at the destination by performing the same processing as described in at least one embodiment and the modification examples. The route guidance may be route guidance for a case in which the user moves on foot, or may be route guidance for a case in which the user moves by driving or riding a vehicle such as a car or a motorcycle. As another example, the estimating system S may be used in any situation, for example, a situation in which an employee of a company providing a service relating to, for example, insurance or communication visits a plurality of contracting parties in order.

There has been described a case in which the main functions are implemented by the server 10, but each function may be shared by a plurality of computers. For example, functions may be shared between the server 10 and the delivery person terminal 20. For example, the processing of the learning model M may be executed by the delivery person terminal 20 in place of the server 10. Further, for example, when the estimating system S includes a plurality of server computers, the functions may be shared by those plurality of server computers. In addition, for example, the data described as being stored in the data storage 100 may be stored by a computer other than the server 10.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An estimating system for obtaining an arrival time even when a destination location is an unknown location with respect to a travel time database, the estimating system comprising at least one processor, the at least one processor being configured to:
    acquire first feature information on each first place of a plurality of first places to which a mobile object is to move in order;
    input the first feature information on the each first place to a learning model comprising a neural network configured to overcome a problem of the unknown location, wherein the neural network has learned, based on first teacher data, a first relationship between second feature information on each second place of a plurality of second places to which one of the mobile object and another mobile object has moved in order in the past and an arrival time at the each second place;
    acquire an arrival time at the each first place estimated by the learning model;
    acquire the arrival time at the each second place and generate second teacher data based on an arrival completion operation performed in the past when one of the mobile object and the another mobile object moved to the each second place; and
    cause the learning model to learn the second teacher data,
    wherein the at least one processor is further configured to restrict the learning model with respect to the second teacher data so as to avoid the neural network learning a second relationship in which a distance between the each second place and a place at which the arrival completion operation corresponding to the second place has been performed becomes equal to or more than a threshold value, whereby, based on the restricting, the arrival time presented in the notification at the receiver person terminal is made more accurate.

2. The estimating system according to claim 1, wherein the first feature information on the each first place includes a first cumulative value corresponding to another first place that is a via point, and
    wherein the second feature information on the each second place includes a second cumulative value corresponding to another second place that is a via point.

3. The estimating system according to claim 2, wherein the mobile object comprises a user who moves in a vehicle, wherein the first feature information on the each first place includes, as the first cumulative value, a first cumulative movement amount measured since the user got off the vehicle, and wherein the second feature information on the each second place includes, as the second cumulative value, a second cumulative movement amount measured since the user got off the vehicle.

4. The estimating system according to claim 3, wherein the first feature information on the each first place includes, as the first cumulative movement amount, a first cumulative walking movement distance that the user has moved on foot since the user got off the vehicle, and wherein the second feature information on the each second place includes, as the second cumulative movement amount, a second cumulative walking movement distance that the user has moved on foot since the user got off the vehicle.

5. The estimating system according to claim 3, wherein the first feature information on the each first place includes, as the first cumulative movement amount, a first cumulative number of stories of a building to which the user has moved since the user got off the vehicle, and wherein the second feature information on the each second place includes, as the second cumulative movement amount, a second cumulative number of stories of a building to which the user has moved since the user got off the vehicle.

6. The estimating system according to claim 1, wherein the at least one processor is configured to notify, before the mobile object arrives at the each first place, a notification destination associated with the each first place of the arrival time at the each first place.

7. The estimating system according to claim 1, wherein the each first place is a delivery destination of a package to be transported by the mobile object, wherein the each second place is a delivery destination of a package transported by one of the mobile object and the another mobile object in the past, and wherein the mobile object and the another mobile object each comprise one of a delivery person and a delivery vehicle.

8. The estimating system of claim 1, wherein the at least one processor is further configured to send a notification of the arrival time to a receiving person terminal.

9. An estimating method for obtaining an arrival time even when a destination location is an unknown location with respect to a travel time database, the estimating method comprising:

acquiring first feature information on each first place of a plurality of first places to which a mobile object is to move in order;

inputting the first feature information on the each first place to a learning model comprising a neural network configured to overcome a problem of the unknown location, wherein the neural network has learned, based on first teacher data, a first relationship between second feature information on each second place of a plurality of second places to which one of the mobile object and another mobile object has moved in order in the past and an arrival time at the each second place;

acquiring an arrival time at the each first place estimated by the learning model;

acquiring the arrival time at the each second place and generating second teacher data based on an arrival completion operation performed in the past when one of the mobile object and the another mobile object moved to the each second place; and causing the learning model to learn the second teacher data, wherein the learning model is restricted with respect to the second teacher data so as to avoid the neural network learning a second relationship in which a distance between the each second place and a place at which the arrival completion operation corresponding to the second place has been performed becomes equal to or more than a threshold value, whereby, based on the restricting, the arrival time presented in the notification at the receiver person terminal is made more accurate.

10. The estimating method of claim 9, further comprising sending a notification of the arrival time to a receiving person terminal.

11. A non-transitory information storage medium having stored thereon a program for obtaining an arrival time even when a destination location is an unknown location with respect to a travel time database by causing a computer to:

acquire first feature information on each first place of a plurality of first places to which a mobile object is to move in order;

input the first feature information on the each first place to a learning model comprising a neural network configured to overcome a problem of the unknown location, wherein the neural network has learned, based on first teacher data, a first relationship between second feature information on each second place of a plurality of second places to which one of the mobile object and another mobile object has moved in order in the past and an arrival time at the each second place; and acquire an arrival time at the each first place estimated by the learning model;

acquire the arrival time at the each second place and generate second teacher data based on an arrival completion operation performed in the past when one of the mobile object and the another mobile object moved to the each second place; and cause the learning model to learn the second teacher data, wherein the at least one processor is further configured to restrict the learning model with respect to the second teacher data so as to avoid the neural network learning a second relationship in which a distance between the each second place and a place at which the arrival completion operation corresponding to the second place has been performed becomes equal to or more than a threshold value, whereby, based on the restricting, the arrival time presented in the notification at the receiver person terminal is made more accurate.

12. The non-transitory information storage medium of claim 11, wherein the program is further configured to cause the computer to send a notification of the arrival time to a receiving person terminal.

* * * * *